United States Patent [19]
Sasuta et al.

[11] Patent Number: 5,862,490
[45] Date of Patent: Jan. 19, 1999

[54] COMMUNICATION SERVICES NEEDS OF A COMMUNICATION UNIT SUPPLIED THROUGH SIMULTANEOUS AFFILIATION WITH MULTIPLE SERVICE PROVIDERS IN A COMMUNICATION SYSTEM

[75] Inventors: Michael D. Sasuta, Mundelein; Mark L. Shaughnessy, Algonquin; Stuart W. Thro, Cary, all of Ill.

[73] Assignee: Motorola, Inc., Schaumburg, Ill.

[21] Appl. No.: 535,601

[22] Filed: Sep. 28, 1995

[51] Int. Cl.⁶ .................................................. H04Q 7/20
[52] U.S. Cl. ........................... 455/525; 435/433; 435/435
[58] Field of Search .................................. 455/33.1, 33.4, 455/54.1, 54.2, 56.1, 63, 34.1, 517, 433, 435, 450, 509, 524, 525; 379/58, 59

[56] References Cited

U.S. PATENT DOCUMENTS 5,392,458 2/1995 Sasuta et al. ........................... 455/33.1
5,574,973 11/1996 Borth et al. ............................. 455/54.2
5,579,535 11/1996 Orlen et al. ............................. 455/33.1
5,583,914 12/1996 Chang et al. ............................. 379/58

Primary Examiner—Edward F. Urban
Attorney, Agent, or Firm—James A. Coffing; George C. Pappas

[57] ABSTRACT

A radio communication system (100, 200) employs a method of providing communication services to a communication unit (104, 105) having a plurality of service requirements. The radio communication system (100, 200) further includes a plurality of service providers (101–103) for which the communication unit catalogues (506, 512) service attributes as part of the inventive method. Further, for each of the service requirements, the communication unit (104, 105) selects (514) one of the plurality of service providers (101–103) to facilitate that service requirement.

26 Claims, 4 Drawing Sheets

| | 302 | 304 | 306 | |
|---|---|---|---|---|
| | | DATA-S | 1004,1012 | —308 |
| | 101 | TELE | 1011 | —310 |
| | | GROUP | 1012,1022,1025 | —312 |
| | | DATA-F | 1001,1005,1013 | —314 |
| | 102 | TELE | 1025 | —316 |
| | | VIDEO | - | —318 |
| | 103 | TELE | 1001 | —320 |
| | | FAX | 1010,1025 | —322 |

<u>400</u>

| 401 | 403 | 405 | 407 | |
|---|---|---|---|---|
| 101 | -125 | 40 | 10 | —409 |
| 102 | -85 | 25 | 4 | —411 |
| 103 | -100 | 100 | 1 | |
| (SERVICE PROVIDER ID) | (RSSI-dbm) | (RESOURCE USAGE-%) | (NUMBER RESOURCES AVAILABLE) | |

FIG.4

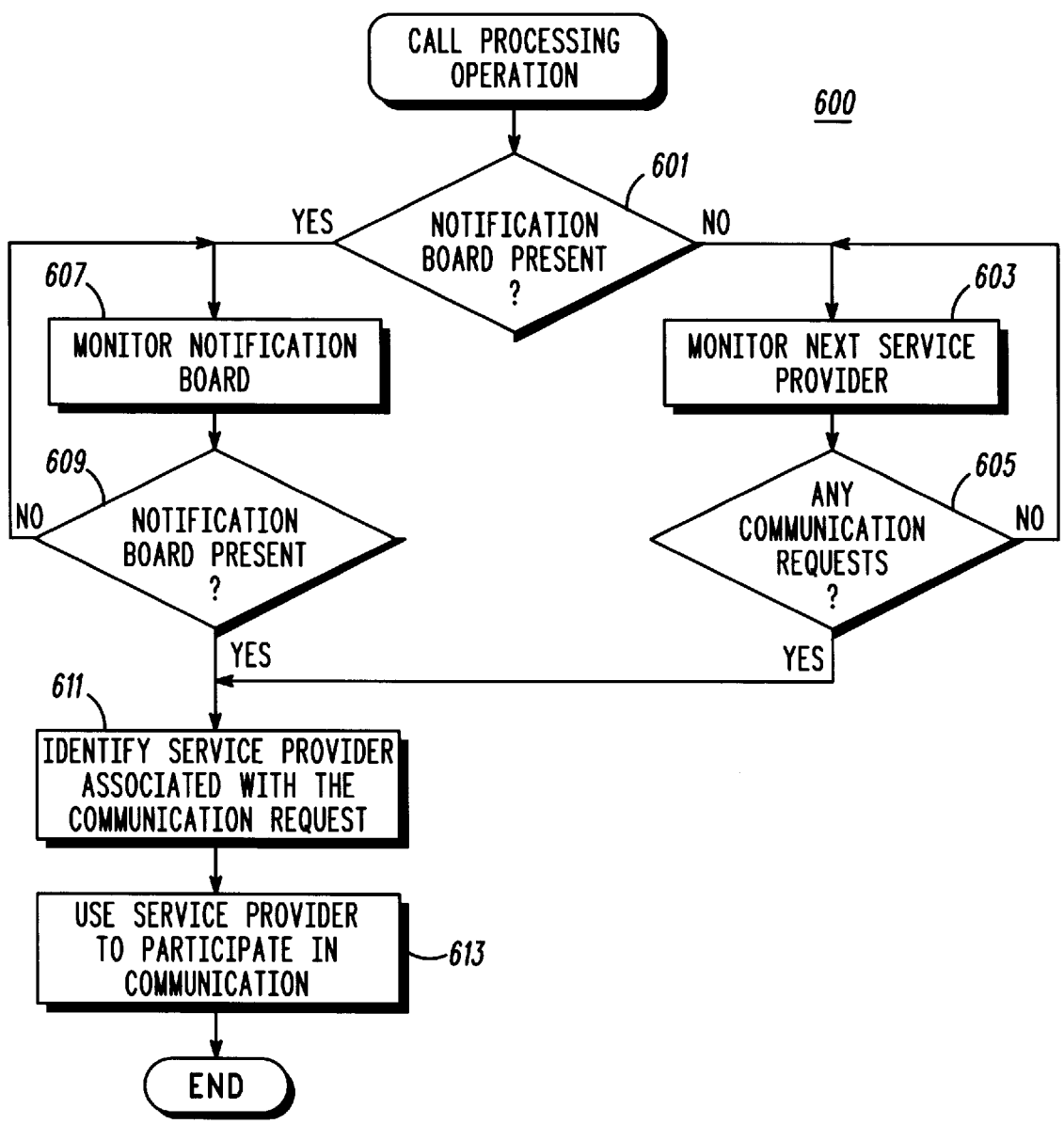

COMMUNICATION SERVICES NEEDS OF A COMMUNICATION UNIT SUPPLIED THROUGH SIMULTANEOUS AFFILIATION WITH MULTIPLE SERVICE PROVIDERS IN A COMMUNICATION SYSTEM

FIELD OF THE INVENTION

The present invention relates generally to radio communication systems, and in particular to a method of providing communication services to a communication unit within such a system.

BACKGROUND OF THE INVENTION

Radio communication systems are known to include a plurality of communication service providers that are accessed by a plurality of communication units requiring such communication services. In such a system, communication units (e.g., portable and mobile radios) typically require one or more communication services such as talk-group calls, telephone interconnect, fax, high speed data, or low speed data. Further, advanced communication units are also capable of transmitting and receiving video and multimedia information over the air. In order to facilitate communications involving these types of resources, the communication unit must be able to access a service provider that is equipped with hardware (i.e. specialized equipment for each such resource) to complete the call.

There are several problems associated with the typical configuration described above. First, in order to meet all of a set of service requirements for a particular communication unit, the communication unit must find a service provider that can facilitate each of these types of communication. Assuming that there are some communication units that have extensive communications capabilities, and further assuming that these communication units roam throughout a large coverage area, this would require that each of the service providers within that coverage area be suitably equipped to handle all of these services. Such a configuration, particularly in high density areas requiring many service providers, is both cost prohibitive and resource inefficient. That is, because each of these communication services require expensive hardware, large scale redundancy results in system that is far too expensive to build and maintain. Further, while the radios roaming throughout the coverage area are capable of using these extensive resources, the lesser used of these resources remain idle for a high percentage of the time, thereby making for inefficient utilization.

A second problem with the foregoing configuration occurs after a particular service provider has been selected by a communication unit to provide communication services. As the communication unit roams throughout the coverage area, the signal quality or congestion of a particular service resource may degrade to an unacceptable level. Thus, the communication unit would need to re-affiliate with another service provider in order to establish a more reliable connection. This added step of having to re-affiliate can be quite problematic, particularly in areas where the signal quality and congestion are at or near threshold levels, resulting in undesired chatter.

When a communication unit cannot find a single service provider capable of supporting all of its service requirements, then the communication unit may still affiliate with a service provider that provides some portion of the set of service requirements. Thereafter, the communication unit has the supported services available to it, but is incapable of using the unsupported service requirements. That is, when the communication unit determines a need for one of these unsupported services, it must search for a suitable service provider to support this service requirement, potentially at the expense of losing support for other service requirements of that communication unit.

Accordingly, there exists a need for an improved method of providing communication services to roaming communication units that is not constrained by the shortcomings of the prior art. In particular, such a system that could economically and efficiently utilize the available communication service resources would be an improvement over the prior art.

BRIEF DESCRIPTION OF THE DRAWINGS

FIG. 3 shows a first portion of a central service directory, in accordance with the present invention;

FIG. 4 shows a second portion of a central service directory, in accordance with the present invention;

FIG. 6 shows a flow diagram depicting the call processing operation, in accordance with the present invention.

DETAILED DESCRIPTION OF THE PREFERRED EMBODIMENT

The present invention encompasses a method by which communication services are provided to a plurality of roaming communication units that each have one or more communication service requirements. These communication service requirements are facilitated through the use of service providers, with overlapping coverage areas, that each can provide one or more communications services to a requesting communication unit. According to the inventive method, the communication unit catalogues the service attributes for each of the plurality of service providers so that a determination can be made as to which service providers are necessary to meet their service requirements. Thus, for each of the plurality of service requirements, one of the plurality of service providers is selected concurrently in order to facilitate that service requirement. In this manner, the present invention eliminates the need to provide an undue number of communication service capabilities at each of the many service providers. Further, the shortcomings of the prior art are avoided by allowing the communication unit to affiliate with more than one service provider to allow a cost effective, efficient utilization of the available communication resources.

Figure 1:
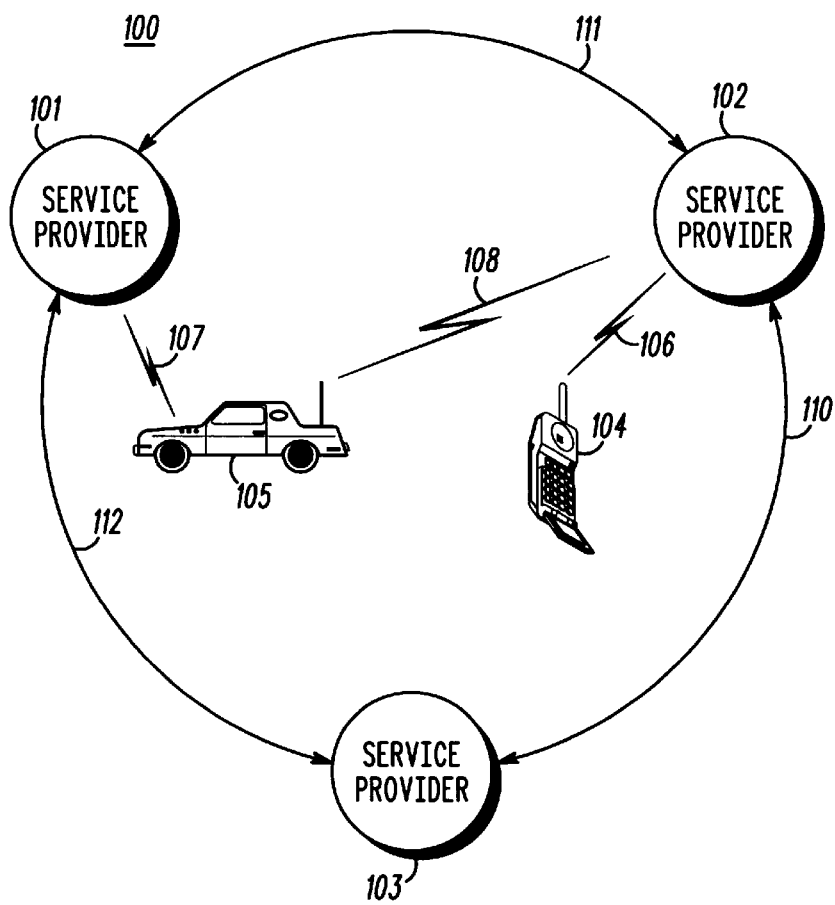
FIG. 1 shows a radio communication system, in accordance with a first embodiment of the present invention.

The present invention can be better understood with reference to FIGS. 1–6. FIG. 1 shows a radio communication system 100 that includes a plurality of service providers 101–103 that collectively provide communication services for communication units 104–105 roaming throughout the coverage area. For example, communication unit 104 utilizes service provider 102 and communication service resource 106 to establish communications. Similarly, communication unit 105 uses both service providers 101 and 102 (in conjunction with resources 107 and 108, respectively) to establish communications, as later described. In a preferred embodiment, the service provider provides resource capability information to the communication unit via a control channel. The communication unit monitors the control channel of the service provider and may request registration to this service provider by sending a message on the control channel to the service provider, as is known in the art. The service provider then returns a confirmation to the communication unit that the communication unit is now affiliated with this service provider.

The service providers may be sites of a multiple site configuration, or they may each be independent systems configured into a communication system network. The service providers themselves are linked in a network via links 110–112. These links may be embodied as dedicated wirelines, dial-up wirelines, RF channels, or any suitable equivalent.

Figure 2:
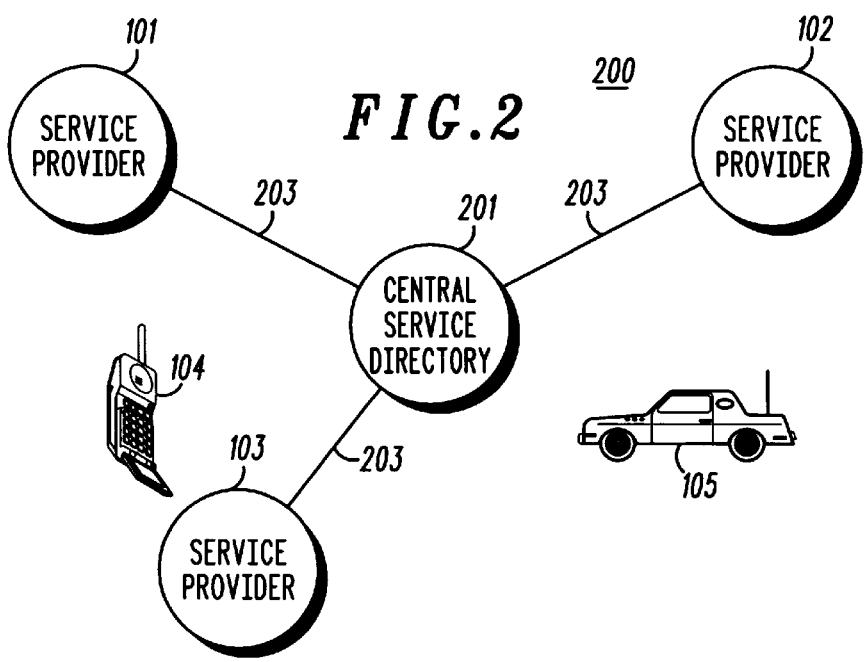
FIG. 2 shows a radio communication system, in accordance with an alternate embodiment of the present invention.

FIG. 2 shows a communication system 200, in accordance with an alternate embodiment of the present invention. Communication system 200 includes many of the same elements as communication system 100, with one significant addition. A central service directory 201, which stores service provider information as later described, is linked to each service provider in the communication system 200. In particular, links 203 (which might be, for example, direct wirelines, dial-up wirelines, or RF channels) provide a centralized point for information regarding available services, active communications, and present affiliations. It should be noted that, in a preferred embodiment, the central service directory includes an affiliation list, service attribute list and a notification board, which are accessed by the service providers and communication units, as later described.

With the centralized configuration of FIG. 2, because the communication units need not access each of the individual service providers to acquire information concerning the service capabilities and active communications, the communication unit is able to more quickly determine the service provider(s) necessary to satisfy their service requirement needs. Further, the communication unit is able to respond to communication requests more rapidly, as activity on any of the individual service providers is presented to the communication unit directly by the centralized directory 201, without the need to query the service providers individually.

FIG. 3 shows an affiliation list 300, in accordance with the present invention. The affiliation list 300 includes fields 302, 304, and 306 for storing service provider identifiers (IDs), communication service types, and affiliated communication units, respectively. It should be noted that while affiliation list 300 is shown as it might appear in a centralized configuration (like the one shown in FIG. 2), the same information can be stored in a distributed fashion among the many service providers (e.g., records 308, 310 and 312 being stored at service provider 101, records 314, 316 and 318 being stored at service provider 102, etc.). It should also be noted that the same services or even the same number of services need not be supported across each service provider. Additionally, the affiliation of communication units to service providers need not be uniformly spread across the available service providers.

Referring to the affiliation list 300, a number of illustrative entries are noted:

1) Communication unit 1012 requires slow data ("DATA-S") and talkgroup call ("GROUP") services. Thus, communication unit 1012 affiliates with service provider 101 to provide the slow data service, as indicated by record 308. Additionally, communication unit 1012's affiliation with service provider 101 enables talkgroup call service, as indicated by record 312.

2) Communication unit 1001 requires fast data ("DATA-F"), and telephone interconnect ("TELE") services. Fast data service is provided by service provider 102 only, and thus communication unit 1001 affiliates with service provider 102, as indicated by record 314. Telephone interconnect service is provided by service providers 101, 102, and 103, as indicated in field 304. Thus, any of these service providers could satisfy this service need of communication unit 1001. However, since communication unit 1025 has already affiliated with service provider 102 (as indicated by record 316) for such services, service provider 103, with no currently active affiliation, is chosen to provide the telephone interconnect service for communication unit 1001, as indicated by record 320.

3) Communication unit 1025 requires the following services: talkgroup call, telephone interconnect, and facsimile ("FAX"). Service provider 101 is the only available service provider supporting talkgroup call service. Thus, communication unit 1025 affiliates with service provider 101 to provide talkgroup call service. FAX service is supported only by service provider 103, and thus communication unit 1025 affiliates with service provider 103 for this service. Telephone interconnect service is provided by each of the service providers 101, 102, and 103. All things being equal, communication unit 1025 could choose either service provider 101 or 103 to minimize the number of service providers being used by this unit. However, communication unit 1025 has determined that there is some characteristic of service provider 102 (e.g., better signal strength) that provides better support of this service, and thus affiliates with it to satisfy its telephone interconnect needs.

4) Of course, some service capabilities are provided by a service provider with no corresponding present need for this service from the communication units. For example, video service ("VIDEO") is supported by service provider 102, but none of the communication units presently have video service as one of the required services. Thus, there is no affiliation by any communication units to this service at this service provider, as indicated by record 318.

5) Lastly, a communication unit might support only one service requirement. This leads to the communication unit affiliating with a single service provider to support this service need. For example, communication unit 1011 has the requirement for telephone interconnect services only. While this service could be accommodated by service providers 101, 102, or 103, as indicated by field 304, the communication unit selects from these available service providers (e.g., on the basis of resource congestion as later described) for this service. Here, communication unit 1011 chooses service provider 101 to affiliate with for the telephone interconnect service, as indicated by record 310.

FIG. 4 shows a second portion of the centralized/distributed directory, in accordance with the present invention. This shows possible service provider characteristics of signal quality (i.e., field 403), resource usage (i.e., field 405), and resource availability (i.e., field 407), for a given communications service type at each of the service providers (401). It is these characteristics that, according to the invention, may be used by the communication units to select a service provider. (It should be noted that a similar set of characteristics are maintained for each service type supported by the respective service providers.) It should be further noted that, while directory 400 is shown as it might appear in a centralized configuration (like the one shown in FIG. 2), the same information might alternatively be distributed among the many service providers (e.g., fields 409 being stored at service provider 101, fields 411 being stored at service provider 102, etc.).

In a preferred embodiment, the communication unit uses this service characteristic information by comparing them against corresponding threshold values for these characteristics. In this manner, the communication unit can determine whether a particular service provider should be considered for providing a particular service. As an example, the signal quality characteristic (e.g., received signal strength indication, or RSSI) might have a threshold of −90 dB, thus rendering only service provider 102 as an appropriate choice for providing the service characterized for each service provider shown in FIG. 4.

Figure 5:
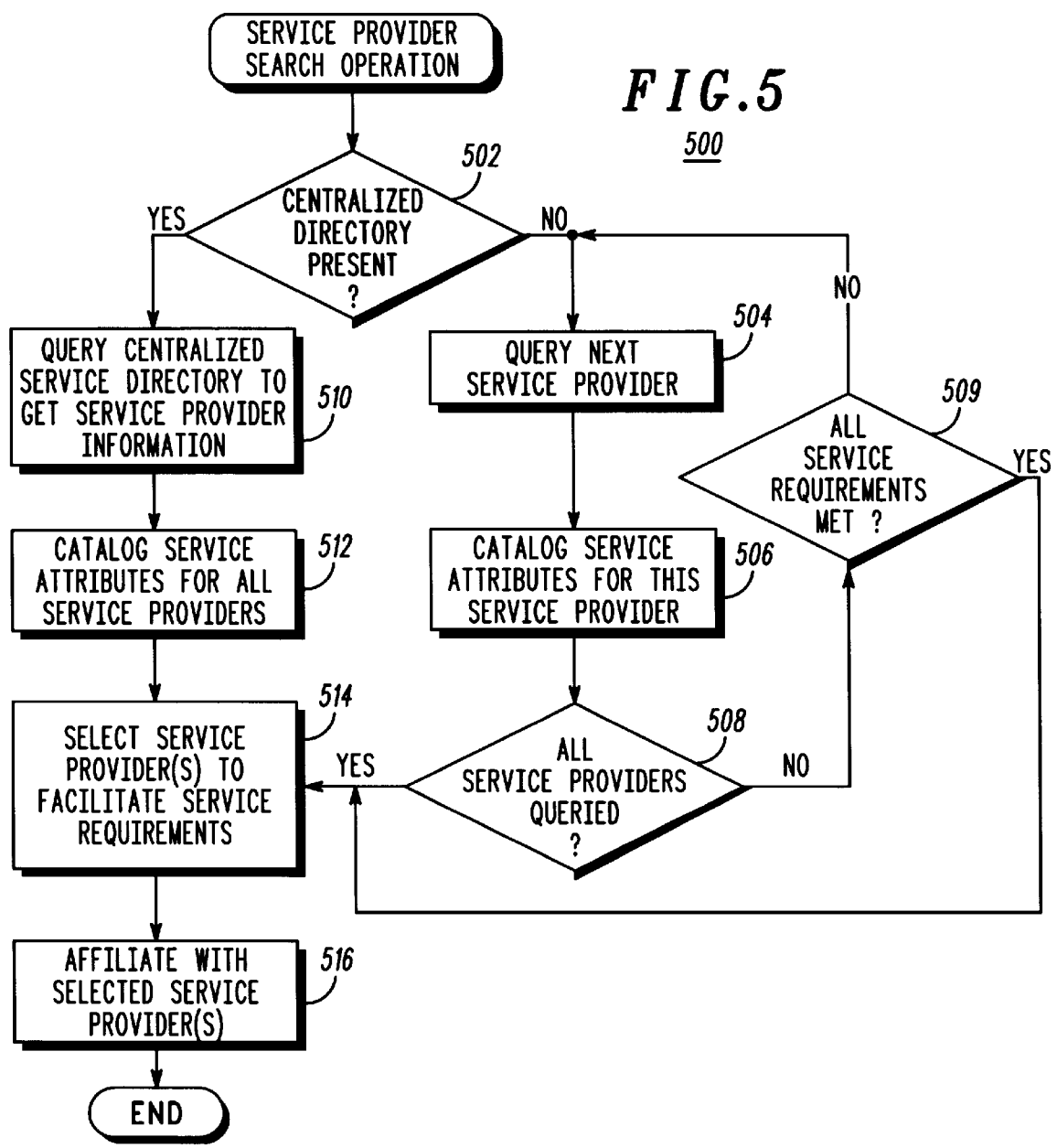
FIG. 5 shows a flow diagram depicting the service provider search operation, in accordance with the present invention.

FIG. 5 shows a flow diagram 500 depicting the method by which the communication unit searches for a service provider to facilitate its required communication services. It is first determined (502) whether or not a centralized directory is present in the radio communication system. If no such centralized directory is present, the communication unit queries (504) a service provider to gain information about it. The communication unit then catalogs (506) the service attributes for the service provider, thereby keeping track of the services that can be provided, as well as the service characteristics associated therewith (recorded as shown in FIG. 4). A decision is then reached to determine (508) whether all of the service providers have been queried. If all service providers have been queried, the service providers are selected, and affiliation with those service providers takes place, as later described. If less than all service providers have been queried, the remaining service providers are queried until all of the service requirements are met (509).

In the configuration that includes a centralized directory, the centralized directory is queried (510) to gather service provider information. The communication unit then catalogues (512) the service attributes for each of the service providers identified in the centralized service directory. At this point, the service providers identified as being necessary to facilitate the service requirements of the communication unit are selected (514), in accordance with the invention. These selected service providers are then affiliated with (516) by the communication unit requiring service.

There are numerous ways in which the communication unit might choose, for each service required, a service provider among the multiple service providers able to provide a service. One such method might be to decide based simply upon the signal quality for the service from each of the available service providers. In such an embodiment, the communication unit might opt for the service provider having the most favorable signal quality (e.g., highest RSSI) for this service. In the example shown in FIG. 4, this yields service provider 102, which shows a best signal quality of −85 dB, indicated by record 403. Another method might be to determine which of the possible service providers can support this service with the best resource availability. Considering this characteristic independently, and referring again to FIG. 4, service provider 101 would be selected, as it provides the best resource availability (e.g., 10 available talkgroup call resources). In this manner, the present invention can be employed to facilitate communications under all or a preferred subset (i.e., some communication requirements may be of greater importance and thus be given higher priority) of the service requirements using either a minimal number of service providers or a set of service providers that provide an optimal performance metric for the services desired.

In a preferred embodiment, the communication unit considers multiple characteristics of the service providers to select the best- overall service provider. For example, assume that the communication unit catalogues the information as depicted in FIG. 4 for a required service (e.g., talkgroup calls), and requires both signal quality and resource availability to be optimized. In this case, the communication unit would select service provider 102 for this service, as it has the best signal quality and the next best resource availability.

The foregoing technique is employed for each communication service type that a communication unit requires. Thus, it is quite possible that the communication unit will determine that it must select multiple service providers to support all of its service requirements. In this manner, the communication unit can provide optimal service support for each individual service required, instead of opting for potentially non-optimal service support for some of its required services by selecting a single service provider to support all its service requirements, as in the prior art.

FIG. 6 shows a flow diagram 600 depicting the call processing operation, in accordance with the present invention. A first step determines (601) whether or not a centralized notification board is present. If not, as is the case in the distributed radio communication system shown in FIG. 1, the service providers are individually monitored (603) by the communication unit, in any suitable manner, as is known in the art. A decision is then reached to determine (605) whether or not there are any communication requests pending at that service provider intended for that communication unit. If not, the next service provider is monitored for communication requests and the process continues for all the affiliated service providers, until a communication request is detected. Upon detection of a communication request intended therefor, the communication unit identifies the appropriate service provider and participates in the communication, as later described.

In the configuration that includes a centralized notification board, the communication unit monitors (607) the notification board looking for communication requests. A decision is then reached to determine (609) whether or not there are any communication requests intended for that communication unit. If not, the communication unit continues to monitor the notification board until detecting a communication request. Upon detection of a communication request intended therefor, the communication unit identifies (611) the service provider associated with that communication request. The communication unit then uses (613) the identified service provider to participate in the communication.

Additionally, it is possible in the configuration without a centralized notification board, that communication requests received by one service provider might be forwarded to another service provider that is currently hosting the target communication unit for communications of the type requested. This is made possible through the use of a combined affiliation list (such as the one shown in FIG. 3) and a record of current service activity of a communication unit. Thus, any new service activity for the communication unit at a second affiliated service provider can be made known to the communication unit active at a first service provider. The communication unit may then act upon the new communication request by going to the service provider supporting this request and processing the request there.

To meet all or a preferred subset of service requirements for a particular communication unit, the communication unit must find one or more service provider(s) that can facilitate these types of communication. The present invention allows the communication unit to satisfy its service requirements through simultaneous affiliations with as many service providers as is necessary. This constitutes a significant improvement over the prior art approach of having the communication unit select a single service provider to address all the service needs of the communication unit, thus resulting in some of the services going unsupported, or less than optimally supported, by the chosen service provider.

Additionally, the current invention allows the selection of service providers to be dynamic for each service. Thus, as the "quality" of a first service provider's support of a service degrades, the communication unit can affiliate with a second service provider having a better quality rating for that service, while still allowing the communication unit to retain affiliation with the first service provider for other required services. This is an improvement over the prior art approach, where degradation in quality of a single service potentially affected the quality of all the other services, as these services were all being facilitated by a single service provider.

What is claimed is:

1. In a communication system comprising separate service providers, a method of enabling a communication unit to select separate service providers to individually satisfy its communication service needs, the method comprising the communication unit performed steps of:
cataloguing service attributes for each of the plurality of service providers;
identifying a request for a communication; and,
for at least two service needs of the communication unit, simultaneously selecting for affiliation, on the basis of said catalogued service attributes, at least two corresponding separate ones of said service providers capable of servicing said at least two service needs;
wherein each service provider maintains an affiliation list identifying each communication unit affiliated therewith and the associated service need, and whereby the step of identifying the communication request is in response to a service provider identifying the communication unit as being affiliated and forwarding the request thereto.

2. The method of claim 1, wherein the step of cataloguing includes the step of querying a centralized service directory.

3. The method of claim 1, wherein the step of cataloguing includes the step of querying at least one of the plurality of service providers.

4. The method of claim 1, wherein the step of simultaneously selecting comprises the step of identifying a minimum number of service providers that collectively facilitate all of the service needs of the communication unit.

5. The method of claim 1, wherein the step of simultaneously selecting comprises the step of identifying a set of service providers that collectively facilitate all of the service needs of the communication unit.

6. The method of claim 1, wherein the step of cataloguing comprises the steps of:
for each service need, identifying at least one service provider capable of supporting that service need to produce at least one identified service provider; and
recording a signal quality metric for each of the at least one identified service provider.

7. The method of claim 6, wherein the step of simultaneously selecting comprises the step of selecting, for each service need, a service provider having a favorable signal quality metric associated therewith.

8. The method of claim 1, wherein the step of cataloguing comprises the steps of:
for each service need, identifying at least one service provider capable of supporting that service need; and
recording a resource usage metric for each of the at least one identified service provider.

9. The method of claim 8, wherein the step of simultaneously selecting comprises the step of identifying, for each service need, a service provider having a favorable resource usage metric associated therewith.

10. The method of claim 1, wherein the step of cataloguing comprises the steps of:
for each service need, identifying at least one service provider capable of supporting that service need; and
recording a resource availability metric for each of the at least one identified service provider.

11. The method of claim 10, wherein the step of simultaneously affiliating comprises the step of identifying, for each service need, a service provider having a favorable resource availability metric associated therewith.

12. The method of claim 1, further comprising the step of affiliating to the at least two corresponding separate ones of said service providers.

13. The method of claim 1, further comprising the step of:
affiliating to the at least two corresponding separate ones of said service providers, wherein the step of identifying the request for the communication, includes monitoring each affiliated service provider to identify the communication request.

14. The method of claim 1, further comprising the step of affiliating to the at least two corresponding separate ones of said service providers, the request being forwarded to the communication unit from said at least two affiliated service providers.

15. The method of claim 1, wherein the step of identifying the communication request is in response to a service provider forwarding the request to a centralized notification board and the communication unit monitoring the centralized notification board to identify said request.

16. In a communication system comprising separate service providers, a method of enabling a communication unit to select separate service providers to individually satisfy its communication service needs, the method comprising the communication unit performed steps of:
querying a centralized service directory to determine service attributes for each of the plurality of service providers;
identifying a request for a communication; and
for each service need of the communication unit, affiliating with a corresponding separate one of said service providers capable of servicing that service need;
wherein at least a first service provider comprises an affiliation list including affiliation information of the other service providers, and whereby in response to the request for a communication with the communication unit and the affiliation information, said at least first service provider forwards the request to the service provider with which said communication unit is presently affiliated.

17. The method of claim 16, wherein the step of affiliating comprises the step of identifying a minimum number of service providers that collectively facilitate all of the service needs of the communication unit.

18. The method of claim 16, wherein the step of affiliating comprises the step of identifying a set of service providers that collectively facilitate all of the service needs of the communication unit.

19. The method of claim 16, wherein the step of affiliating comprises the step of identifying, for each service need, a resource usage metric associated therewith.

20. The method of claim 19, wherein the step of affiliating comprises the step of identifying, for each service need, a service provider having a favorable resource usage metric associated therewith.

21. The method of claim 16, further comprising the step of identifying by the communication unit a communication request thereto, wherein the step of identifying the communication request is in response to a service provider forwarding the request to a centralized notification board and the communication unit monitoring the centralized notification board to identify said request.

22. In a communication system comprising separate service providers, a method of enabling a communication unit to select separate service providers to individually satisfy its communication service needs, the method comprising the communication unit performed steps of:
querying each of the plurality of service providers to determine service attributes associated therewith;
identifying a request for a communication; and for each service need of the communication unit, affiliating with a corresponding separate one of said service providers capable of servicing that service need;

wherein at least a first service provider comprises an affiliation list including affiliation information of the other service providers, and whereby in response to the request for a communication with the communication unit and the affiliation information, said at least first service provider forwards the request to the service provider with which said communication unit is presently affiliated.

23. The method of claim 22, wherein the step of affiliating comprises the step of identifying a minimum number of service providers that collectively provide all of the service needs of the communication unit.

24. The method of claim 22, wherein the step of affiliating comprises the step of identifying a set of service providers that collectively provide all of the service needs of the communication unit.

25. The method of claim 22, further comprising the step of determining, for each affiliated service provider, a signal quality metric associated therewith.

26. The method of claim 25, wherein the step of affiliating comprises the step of identifying, for each service need, a service provider having a favorable signal quality metric associated therewith.

* * * * *